(12) United States Patent
Baron et al.

(10) Patent No.: US 10,700,989 B2
(45) Date of Patent: Jun. 30, 2020

(54) QOS MANAGEMENT FOR MULTI-USER AND SINGLE USER EDCA TRANSMISSION MODE IN WIRELESS NETWORKS

(71) Applicant: CANON KABUSHIKI KAISHA, Tokyo (JP)

(72) Inventors: Stéphane Baron, Le Rheu (FR); Pascal Viger, Janze (FR); Patrice Nezou, Liffre (FR)

(73) Assignee: Canon Kabushiki Kaisha, Tokyo (JP)

( * ) Notice: Subject to any disclaimer, the term of this patent is extended or adjusted under 35 U.S.C. 154(b) by 264 days.

(21) Appl. No.: 15/859,059

(22) Filed: Dec. 29, 2017

(65) Prior Publication Data

US 2018/0198726 A1 Jul. 12, 2018

(30) Foreign Application Priority Data

Jan. 6, 2017 (GB) .................................. 1700268.4

(51) Int. Cl.
*H04L 12/28* (2006.01)
*H04L 12/863* (2013.01)
(Continued)

(52) U.S. Cl.
CPC ........ *H04L 47/6215* (2013.01); *H04L 47/626* (2013.01); *H04L 47/6295* (2013.01);
(Continued)

(58) Field of Classification Search
CPC ..................................................... H04L 12/28
(Continued)

(56) References Cited

U.S. PATENT DOCUMENTS

| 2016/0014035 A1 | 1/2016 | Ram et al. |
| 2016/0198500 A1 | 7/2016 | Merlin et al. |
| 2019/0313453 A1* | 10/2019 | Baron ............... H04W 74/0816 |

FOREIGN PATENT DOCUMENTS

| EP | 2866514 A2 | 4/2015 |
| GB | 2529672 A | 3/2016 |

(Continued)

OTHER PUBLICATIONS

Pablo Peon, et al., "Towards a Reliable and high-Speed wireless complement to TTEthernet", IEEE emerging Technology and Factory Automation (ETFA), pp. 1-4, published Sep. 16, 2014, XP032718951.

*Primary Examiner* — Dang T Ton
(74) *Attorney, Agent, or Firm* — Canon U.S.A., Inc. IP Division

(57) ABSTRACT

A communication method in a communication network comprising a plurality of nodes, at least one node comprising a plurality of traffic queues for serving data traffic at different priorities, each traffic queue being associated with a respective queue backoff value computed from respective queue contention parameters having first and second values in, respectively, a first and a second contention modes, obtaining quality of service requirements of data stored in a traffic queue of the node; checking whether the quality of service requirements can be fulfilled when accessing the communication channel using the second contention mode; if the requirements cannot be fulfilled as the result of the checking, disabling access to resource units provided by the other node within one or more transmission opportunities granted to the other node on the communication channel; and transmitting data stored in the traffic queue using the first contention mode.

19 Claims, 9 Drawing Sheets

(51) Int. Cl.
  *H04W 72/12* (2009.01)
  *H04W 84/12* (2009.01)
  *H04W 74/08* (2009.01)
(52) U.S. Cl.
  CPC ... *H04W 72/1236* (2013.01); *H04W 74/0808* (2013.01); *H04W 84/12* (2013.01)
(58) Field of Classification Search
  USPC .......................................................... 370/329
  See application file for complete search history.

(56) References Cited

FOREIGN PATENT DOCUMENTS

| | | | |
|---|---|---|---|
| GB | 2555143 A | 4/2018 | |
| WO | 2016/069931 A1 | 5/2016 | |

\* cited by examiner

| AC | $CW_{min}$ | $CW_{max}$ | AIFSN |
|---|---|---|---|
| AC_BK | aCWmin | aCWmax | 7 |
| AC_BE | aCWmin | aCWmax | 3 |
| AC_VI | (aCWmin+1)/2-1 | aCWmin | 2 |
| AC_VO | (aCWmin+1)/4-1 | (aCWmin+1)/2-1 | 2 |

| AC | MU $CW_{min}$ | MU $CW_{max}$ | MU AIFSN |
|---|---|---|---|
| AC_BK | aCWmin | aCWmax | 14 |
| AC_BE | aCWmin | aCWmax | 10 |
| AC_VI | (aCWmin+1)/2-1 | aCWmin | 9 |
| AC_VO | (aCWmin+1)/4-1 | (aCWmin+1)/2-1 | 9 |

QOS MANAGEMENT FOR MULTI-USER AND SINGLE USER EDCA TRANSMISSION MODE IN WIRELESS NETWORKS

CROSS REFERENCE TO RELATED APPLICATION

This application claims the benefit under 35 U.S.C. § 119(a)-(d) of United Kingdom Patent Application No. 1700268.4, filed on Jan. 6, 2017 and entitled "QoS management for multi-user and single user EDCA transmission mode in wireless networks". The above cited patent application is incorporated herein by reference in its entirety.

FIELD OF THE INVENTION

The present invention relates generally to communication networks and more specifically to communication methods in networks offering channel accesses to nodes through different contention schemes and providing secondary accesses to sub-channels (or Resource Units) splitting a transmission opportunity TXOP granted to an access point, in order to transmit data.

BACKGROUND OF THE INVENTION

The IEEE 802.11 MAC family of standards (a/b/g/n/ac/ etc.) define a way wireless local area networks (WLANs) must work at the physical and medium access control (MAC) level. Typically, the 802.11 MAC (Medium Access Control) operating mode implements the well-known Distributed Coordination Function (DCF) which relies on a contention-based mechanism based on the so-called "Carrier Sense Multiple Access with Collision Avoidance" (CSMA/CA) technique.

More recently, Institute of Electrical and Electronics Engineers (IEEE) officially approved the 802.11ax task group, as the successor of 802.11ac. The primary goal of the 802.11ax task group consists in seeking for an improvement in data speed to wireless communicating devices used in dense deployment scenarios.

In this context, multi-user (MU) transmission has been considered to allow multiple simultaneous transmissions to/from different users in both downlink (DL) and uplink (UL) directions from/to the AP and during a transmission opportunity granted to the AP. In the uplink, multi-user transmissions can be used to mitigate the collision probability by allowing multiple non-AP stations to simultaneously transmit. To actually perform such multi-user transmission, it has been proposed to split a granted communication channel into sub-channels, also referred to as resource units (RUs), that are shared in the frequency domain by multiple users (non-AP stations/nodes), based for instance on Orthogonal Frequency Division Multiple Access (OFDMA) technique.

A 802.11ax node has thus the opportunity to gain access to the medium via two access schemes: MU UL access scheme and conventional EDCA (Enhanced Distributed Channel Access) contention-based access scheme. To keep access to the medium fair between the 802.11ax nodes and the legacy nodes, solutions have been proposed to modify, upon successfully transmitting data over an accessed resource unit (i.e. through UL OFDMA transmission), a current value of at least one queue contention parameter into a penalized or degraded value, to reduce a probability for the node to access a communication channel through (EDCA) contention. For instance, the penalized or degraded value is more restrictive than the original (or legacy) value.

Proposed solutions for restoring fairness between 802.11ax nodes and legacy nodes introduce however some complexity for managing the Quality-of-Service (QoS) at a 802.11ax node. For example, strongly penalizing the EDCA medium access when using MU UL may result in that some traffic that cannot be sent using the Multi User Uplink scheme is then strongly penalized and even purely discarded. In this situation the QoS provided by the WLAN is deteriorated and the performance of the application relying on the MAC layer is degraded.

SUMMARY OF INVENTION

The present invention seeks to overcome the foregoing limitations. In particular, it seeks to manage access to the medium by a 802.11ax node while keeping a good QoS.

From 802.11e introduction, and later with 802.11z the station have the possibility to establish direct link communications with peer stations from the same BSS. The invention seeks in particular to handle the QoS for direct link communications.

In this context, the present invention proposes, according to a first aspect, a communication method in a communication network comprising a plurality of nodes, at least one node comprising a plurality of traffic queues for serving data traffic at different priorities, each traffic queue being associated with a respective queue backoff value computed from respective queue contention parameters having first and second values in, respectively, a first and a second contention modes, the first and second contention modes may be used to contend for access to a communication channel in order to transmit data stored in the traffic queue according to different qualities of service, wherein the second contention mode is only available when access to resource units provided by another node within one or more transmission opportunities granted to the other node on the communication channel is enabled;

the method comprising, at the node:

obtaining quality of service requirements of data stored in a traffic queue of the node;

checking whether the quality of service requirements can be fulfilled when accessing the communication channel using the second contention mode;

if the requirements cannot be fulfilled as the result of the checking, disabling access to resource units provided by the other node within one or more transmission opportunities granted to the other node on the communication channel; and transmitting data stored in the traffic queue using the first contention mode.

Correspondingly, the invention also regards a communication device node in a communication network comprising a plurality of nodes, the communication device comprising:

a plurality of traffic queues for serving data traffic at different priorities, each traffic queue being associated with a respective queue backoff value computed from respective queue contention parameters having first and second values in, respectively, a first and a second contention modes, the first and second contention modes may be used to contend for access to a communication channel in order to transmit data stored in the traffic queue according to different qualities of service, wherein the second contention mode is only available when access to resource units provided by another node within one or more transmission opportunities granted to the other node on the communication channel is enabled; and at least one microprocessor configured for carrying out the following steps:

obtaining quality of service requirements of data stored in a traffic queue of the node;

checking whether the quality of service requirements can be fulfilled when accessing the communication channel using the second contention mode;

if the requirements cannot be fulfilled as the result of the checking, disabling access to resource units provided by the other node within one or more transmission opportunities granted to the other node on the communication channel; and transmitting data stored in the traffic queue using the first contention mode.

The present invention proposes, according to a second aspect, a communication method in a communication network comprising a plurality of nodes, at least one node comprising a plurality of traffic queues for serving data traffic at different priorities, each traffic queue being associated with a respective queue backoff value computed from respective queue contention parameters having first and second values in, respectively, a first and a second contention modes, the first and second contention modes may be used to contend for access to a communication channel in order to transmit data stored in the traffic queue according to different qualities of service, wherein the second contention mode is only available when access to resource units provided by another node within one or more transmission opportunities granted to the other node on the communication channel is enabled;

the method comprising, at the node:

obtaining a service requirement for sending data;

determining whether the service requirement is compatible with the first contention mode or the second contention mode for the sending of data;

if it is determined at the determining step that the service requirement is compatible with the first contention mode, disabling access to resource units provided by the other node within one or more transmission opportunities granted to the other node on the communication channel; and transmitting data stored in the traffic queue using the first contention mode.

Correspondingly, the invention also regards a communication device node in a communication network comprising a plurality of nodes, the communication device comprising:

a plurality of traffic queues for serving data traffic at different priorities, each traffic queue being associated with a respective queue backoff value computed from respective queue contention parameters having first and second values in, respectively, a first and a second contention modes, the first and second contention modes may be used to contend for access to a communication channel in order to transmit data stored in the traffic queue according to different qualities of service, wherein the second contention mode is only available when access to resource units provided by another node within one or more transmission opportunities granted to the other node on the communication channel is enabled; and at least one microprocessor configured for carrying out the following steps:

obtaining a service requirement for sending data;

determining whether the service requirement is compatible with the first contention mode or the second contention mode for the sending of data;

if it is determined at the determining step that the service requirement is compatible with the first contention mode, disabling access to resource units provided by the other node within one or more transmission opportunities granted to the other node on the communication channel; and transmitting data stored in the traffic queue using the first contention mode.

The present invention proposes, according to a third aspect, a communication method in a communication network comprising a plurality of nodes, at least one node comprising a plurality of traffic queues for serving data traffic at different priorities, each traffic queue being associated with a respective queue backoff value computed from respective queue contention parameters having first and second values in, respectively, a first and a second contention modes, the first and second contention modes may be used to contend for access to a communication channel in order to transmit data stored in the traffic queue according to different qualities of service, wherein the second contention mode is only available when access to resource units provided by another node within one or more transmission opportunities granted to the other node on the communication channel is enabled;

the method comprising, at the node:

obtaining a service requirement for sending data in a direct link mode;

disabling access to resource units provided by the other node within one or more transmission opportunities granted to the other node on the communication channel; and transmitting in direct link mode data stored in the traffic queue using the first contention mode.

Correspondingly, the invention also regards a communication device node in a communication network comprising a plurality of nodes, the communication device comprising:

a plurality of traffic queues for serving data traffic at different priorities, each traffic queue being associated with a respective queue backoff value computed from respective queue contention parameters having first and second values in, respectively, a first and a second contention modes, the first and second contention modes may be used to contend for access to a communication channel in order to transmit data stored in the traffic queue according to different qualities of service, wherein the second contention mode is only available when access to resource units provided by another node within one or more transmission opportunities granted to the other node on the communication channel is enabled; and at least one microprocessor configured for carrying out the following steps:

obtaining a service requirement for sending data in a direct link mode;

disabling access to resource units provided by the other node within one or more transmission opportunities granted to the other node on the communication channel; and transmitting in direct link mode data stored in the traffic queue using the first contention mode.

The present invention proposes, according to a fourth aspect, a communication method in a communication network comprising a plurality of nodes, at least one node comprising a plurality of traffic queues for serving data traffic at different priorities, each traffic queue being associated with a respective queue backoff value computed from respective queue contention parameters having first and second values in, respectively, a first and a second contention modes, the first and second contention modes may be used to contend for access to a communication channel in order to transmit data stored in the traffic queue according to different qualities of service, wherein the second contention mode is only available when access to resource units provided by another node within one or more transmission opportunities granted to the other node on the communication channel is enabled;

the method comprising, at the node:

disabling access to resource units provided by the other node within one or more transmission opportunities granted to the other node on the communication channel;

setting contention parameters of a contention queue to first values; and transmitting data stored in the respective traffic queue using the first contention mode.

Correspondingly, the invention also regards a communication device node in a communication network comprising a plurality of nodes, the communication device comprising:

a plurality of traffic queues for serving data traffic at different priorities, each traffic queue being associated with a respective queue backoff value computed from respective queue contention parameters having first and second values in, respectively, a first and a second contention modes, the first and second contention modes may be used to contend for access to a communication channel in order to transmit data stored in the traffic queue according to different qualities of service, wherein the second contention mode is only available when access to resource units provided by another node within one or more transmission opportunities granted to the other node on the communication channel is enabled; and at least one microprocessor configured for carrying out the following steps:

disabling access to resource units provided by the other node within one or more transmission opportunities granted to the other node on the communication channel;

setting contention parameters of a contention queue to first values; and transmitting data stored in the respective traffic queue using the first contention.

In embodiments, the method comprising, at the node, periodically receiving a beacon frame from an access point, each beacon frame broadcasting network information about the communication network to the plurality of nodes, wherein at least one received beacon frame includes first values and second values for the queue contention parameters of the plurality of traffic queues.

In embodiments, the other node is an access point of the communication network to which nodes register.

In embodiments, the disabling of access to the resource units comprises sending an information to the access point informing that the node is not supporting access to the resource units.

Another aspect of the invention relates to a non-transitory computer-readable medium storing a program which, when executed by a microprocessor or computer system in a device, causes the device to perform any method as defined above.

The non-transitory computer-readable medium may have features and advantages that are analogous to those set out above and below in relation to the methods and devices.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings.

DETAILED DESCRIPTION

The invention will now be described by means of specific non-limiting exemplary embodiments and by reference to the figures.

Figure 1:
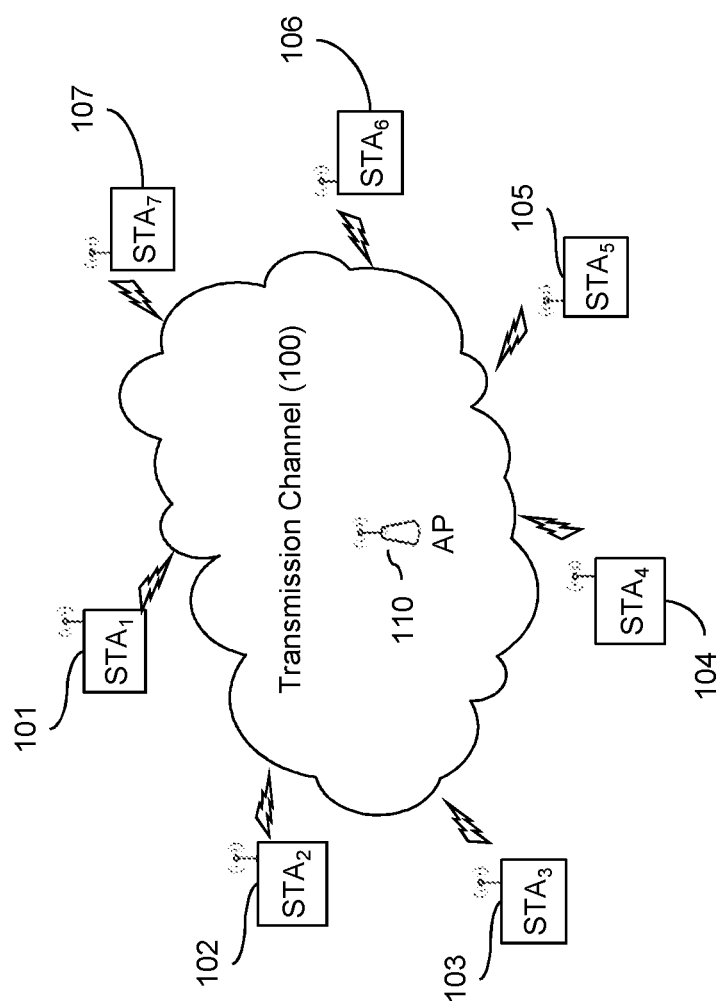
FIG. 1 illustrates a typical wireless communication system in which embodiments of the invention may be implemented.

FIG. 1 illustrates a communication system in which several communication nodes (or stations) 101-107 exchange data frames over a radio transmission channel 100 of a wireless local area network (WLAN), under the management of a central station, or access point (AP) 110 with which the nodes have registered. The radio transmission channel 100 is defined by an operating frequency band constituted by a single channel or a plurality of channels forming a composite channel.

Access to the shared radio medium to send data frames is based on the CSMA/CA technique, for sensing the carrier and avoiding collision by separating concurrent transmissions in space and time.

Carrier sensing in CSMA/CA is performed by both physical and virtual mechanisms. Virtual carrier sensing is achieved by transmitting control frames to reserve the medium prior to transmission of data frames.

Next, a source or transmitting node, including the AP, first attempts, through the physical mechanism, to sense a medium that has been idle for at least one DIFS (standing for DCF InterFrame Spacing) time period, before transmitting data frames.

However, if it is sensed that the shared radio medium is busy during the DIFS period, the source node continues to wait until the radio medium becomes idle.

To access the medium, the node starts a countdown backoff counter designed to expire after a number of timeslots, chosen randomly in a so-called contention window [0, CW], CW being an integer. In the following, CW is also referred to as the contention window for simplicity. This backoff mechanism or procedure, also referred to as channel access scheme, is the basis of the collision avoidance mechanism that defers the transmission time for a random interval, thus reducing the probability of collisions on the shared channel. After the backoff time period (i.e. the backoff counter reaches zero), the source node may send data or control frames if the medium is idle.

One problem of wireless data communications is that it is not possible for the source node to listen while sending, thus preventing the source node from detecting data corruption due to channel fading or interference or collision phenomena. A source node remains unaware of the corruption of the data frames sent and continues to transmit the frames unnecessarily, thus wasting access time.

The Collision Avoidance mechanism of CSMA/CA thus provides positive acknowledgement (ACK) of the sent data frames by the receiving node if the frames are received with success, to notify the source node that no corruption of the sent data frames occurred.

The ACK is transmitted at the end of reception of the data frame, immediately after a period of time called Short InterFrame Space (SIFS).

If the source node does not receive the ACK within a specified ACK timeout or detects the transmission of a different frame on the channel, it may infer data frame loss. In that case, it generally reschedules the frame transmission according to the above-mentioned backoff procedure.

To improve the Collision Avoidance efficiency of CSMA/CA, a four-way handshaking mechanism is optionally implemented. One implementation is known as the RTS/CTS exchange, defined in the 802.11 standard.

The RTS/CTS exchange consists in exchanging control frames to reserve the radio medium prior to transmitting data frames during a transmission opportunity called TXOP in the 802.11 standard, thus protecting data transmissions from any further collisions. The four-way CTS/RTS handshaking mechanism is well known, and thus not further described here. Reference is made to the standard for further details.

The RTS/CTS four-way handshaking mechanism is very efficient in terms of system performance, in particular with regard to large frames since it reduces the length of the messages involved in the contention process.

In detail, assuming perfect channel sensing by each communication node, collision may only occur when two (or more) frames are transmitted within the same time slot after a DIFS (DCF inter-frame space) or when the backoff counters of the two (or more) source nodes have reached zero nearly at the same time. If both source nodes use the RTS/CTS mechanism, this collision can only occur for the RTS frames. Fortunately, such collision is early detected by the source nodes upon not receiving a CTS response.

Management of quality of service (QoS) has been introduced at node level in such wireless networks, through well-known EDCA mechanism defined in the IEEE 802.11e standard.

Indeed, in the original DCF standard, a communication node includes only one transmission queue/buffer. However, since a subsequent data frame cannot be transmitted until the transmission/retransmission of a preceding frame ends, the delay in transmitting/retransmitting the preceding frame prevented the communication from having QoS.

Figures 2A, 2B, 2C:
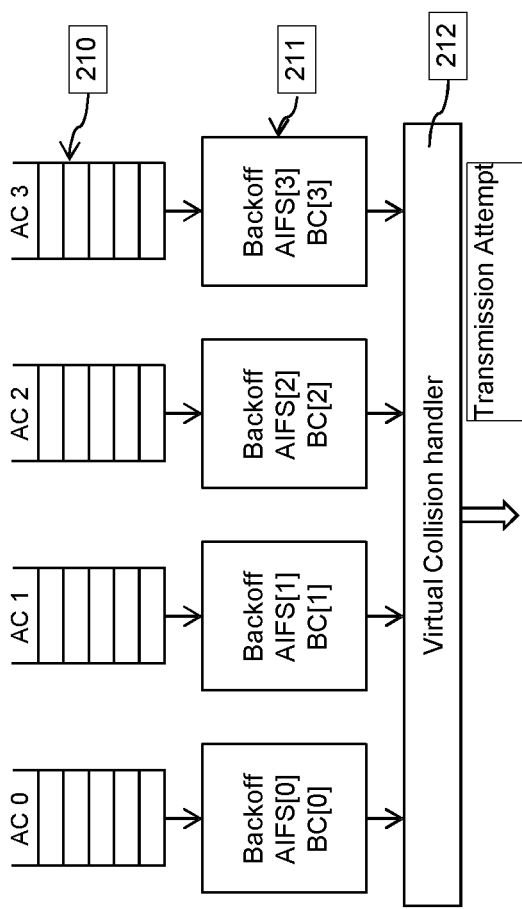
FIGS. 2a, 2b illustrate the IEEE 802.11e EDCA involving access categories.
FIG. 2c illustrates an example of values for the MU EDCA parameters set.

FIGS. 2a and 2b illustrate the IEEE 802.11e EDCA mechanism involving access categories, in order to improve the quality of service (QoS).

The 802.11e standard relies on a coordination function, called hybrid coordination function (HCF), which has two modes of operation: enhanced distributed channel access (EDCA) and HCF controlled channel access (HCCA).

EDCA enhances or extends functionality of the original access DCF method: EDCA has been designed to support prioritized traffics similar to DiffServ (Differentiated Services), which is a protocol for specifying and controlling network traffic by class so that certain types of traffic get precedence.

EDCA is the dominant channel access scheme or mechanism in WLANs because it features a distributed and easily deployed mechanism. The scheme contends for access to at least one communication channel of the communication network using contention parameters, in order for the node to transmit data stored locally over an accessed communication channel.

The above deficiency of failing to have satisfactory QoS due to delay in frame retransmission has been solved with a plurality of transmission queues/buffers.

QoS support in EDCA is achieved with the introduction of four Access Categories (ACs), and thereby of four corresponding transmission/traffic queues or buffers (210). Usually, the four ACs are the following in decreasing priority order: voice (or "AC_VO"), video (or "AC_VI"), best effort (or "AC_BE") and background (or "AC_BG").

Of course, another number of traffic queues may be contemplated.

Each AC has its own traffic queue/buffer to store corresponding data frames to be transmitted on the network. The data frames, namely the MSDUs, incoming from an upper layer of the protocol stack are mapped onto one of the four AC queues/buffers and thus input in the mapped AC buffer.

Each AC has also its own set of queue contention parameters, and is associated with a priority value, thus defining traffics of higher or lower priority of MSDUs. Thus, there is a plurality of traffic queues for serving data traffic at different priorities. The queue contention (EDCA) parameters usually include $CW_{min}$, $CW_{max}$, AIFSN and TXOP_Limit parameters for each traffic queue. $CW_{min}$ and $CW_{max}$ are the lower and higher boundaries of a selection range from which the EDCA contention window CW is selected for a given traffic queue. AIFSN stands for Arbitration Inter-Frame Space Number, and defines a number of time slots (usually 9 µs), additional to a DIFS interval (the total defining the AIFS period), the node must sense the medium as idle before decrementing the queue backoff value/counter associated with the traffic queue considered. TXOP_Limit defines the maximum size of a TXOP the node may request.

That means that each AC (and corresponding buffer) acts as an independent DCF contending entity including its respective queue backoff engine 211. Thus, each queue backoff engine 211 is associated with a respective traffic queue 210 for using queue contention parameters and setting a respective queue backoff value/counter (randomly selected from the contention window CW), to be used to contend for access to at least one communication channel in order to transmit data stored in the respective traffic queue over an accessed communication channel.

The contention window CW and the queue backoff value/counter are known as EDCA variables.

It results that the ACs within a same communication node compete one with each other to access the wireless medium and to obtain a transmission opportunity, using the conventional EDCA access scheme as explained above for example.

Service differentiation between the ACs is achieved by setting different EDCA (queue backoff) parameters between the ACs, such as different $CW_{min}$, $CW_{max}$, AIFSN and/or different transmission opportunity duration limits (TXOP_Limit). This contributes to adjusting QoS.

The usage of the AIFSN parameter and queue backoff values to access the medium in the EDCA mechanism is described below with reference to FIG. 3a.

FIG. 2b illustrates default values for the $CW_{min}$, $CW_{max}$ and AIFSN parameters.

In this table, typical respective values for aCWmin and aCWmax are defined in the above-mentioned standard as being respectively 15 and 1023. Other values may be set by a node in the network (typically an Access Point) and shared between the nodes. This information may be broadcast in a beacon frame.

To determine the delay AIFS[i] between the detection of the medium being free and the beginning of the queue backoff value decrementing for traffic queue 'i', the node multiplies the value indicated in the AIFSN parameter for traffic queue 'i', i.e. AIFSN[i], by a time slot duration (typically 9 micro-seconds), and adds this value to a DIFS duration.

Figures 3A, 3B:
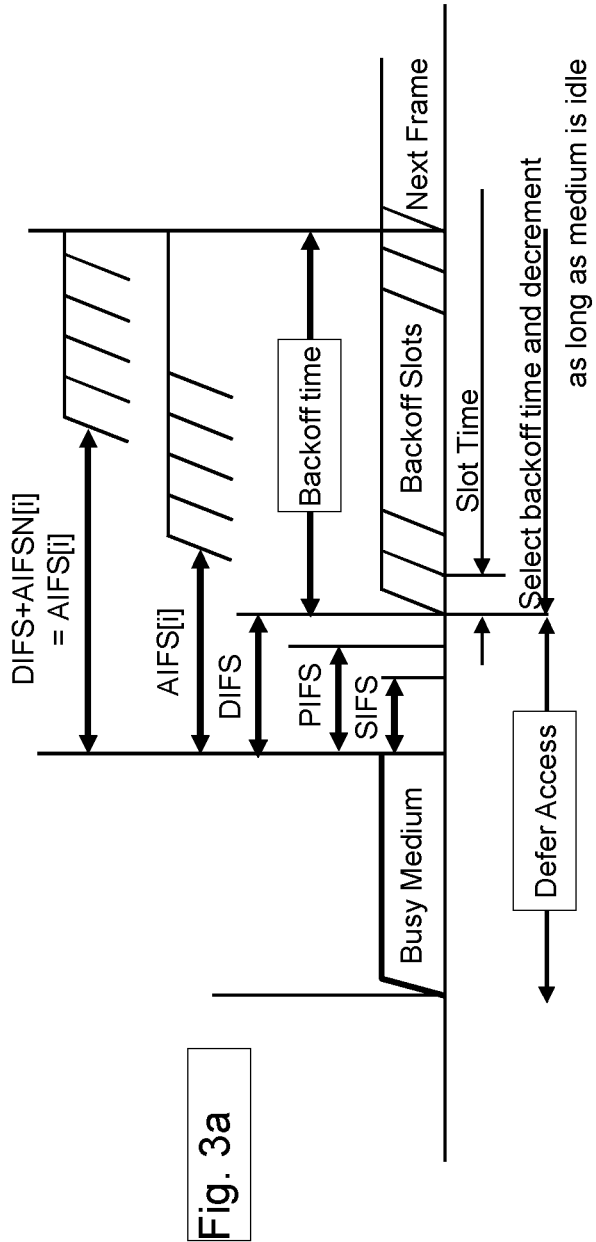
FIG. 3a illustrates 802.11ac mechanism for the backoff counter countdown.
FIG. 3b illustrates an example of mapping between eight priorities of traffic class and the four EDCA ACs.

As shown in FIG. 3a, it results that each traffic queue waits an AIFS[i] period (that includes the DIFS period deferring access to the medium) before decrementing its associated queue backoff value/counter. The Figure shows two AIFS[i] corresponding to two different ACs. One can see that one prioritized traffic queue starts decrementing its backoff value earlier than the other less prioritized traffic queue. This situation is repeated after each new medium access by any node in the network.

This decrementing deferring mechanism, additional to the use of an on-average lower CW, makes that high priority traffic in EDCA has a higher chance to be transmitted than low priority traffic: a node with high priority traffic statistically waits a little less before it sends its packet, on average, than a node with low priority traffic.

The EDCA queue backoff values or counters thus play two roles. First, they drive the nodes in efficiently accessing the medium, by reducing risks of collisions. Second, they offer management of quality of service, QoS, by mirroring the aging of the data contained in the traffic queue (the more aged the data, the lower the backoff value) and thus providing different priorities to the traffic queues through different values of the EDCA parameters (especially the AIFSN parameter that delays the start of the decrementing of the EDCA queue backoff values).

Referring to FIG. 2a, buffers AC3 and AC2 are usually reserved for real-time applications (e.g., voice AC_VO or video AC_VI transmission). They have, respectively, the highest priority and the last-but-one highest priority.

Buffers AC1 and AC0 are reserved for best effort (AC_BE) and background (AC_BG) traffic. They have, respectively, the last-but-one lowest priority and the lowest priority.

Each data unit, MSDU, arriving at the MAC layer from an upper layer (e.g. Link layer) with a priority is mapped into an AC according to mapping rules. FIG. 3b shows an example of mapping between eight priorities of traffic class (User Priorities or UP, 0-7 according to IEEE 802.1d) and the four ACs. The data frame is then stored in the buffer corresponding to the mapped AC.

When the backoff procedure for a traffic queue (or an AC) ends, the MAC controller (reference 704 in FIG. 7 below) of the transmitting node transmits a data frame from this traffic queue to the physical layer for transmission onto the wireless communication network.

Since the ACs operate concurrently in accessing the wireless medium, it may happen that two ACs of the same communication node have their backoff ending simultaneously. In such a situation, a virtual collision handler (212) of the MAC controller operates a selection of the AC having the highest priority (as shown in FIG. 3b) between the conflicting ACs, and gives up transmission of data frames from the ACs having lower priorities.

Then, the virtual collision handler commands those ACs having lower priorities to start again a backoff operation using an increased CW value.

The QoS resulting from the use of the ACs may be signalled in the MAC data frames, for instance in a QoS control field included in the header of the IEEE 802.11e MAC frame.

Figure 4:
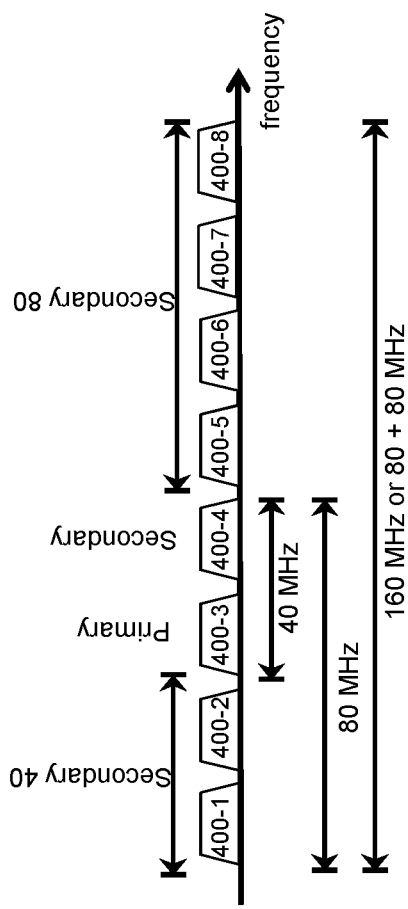
FIG. 4 illustrates 802.11ac channel allocation that support channel bandwidth of 20 MHz, 40 MHz, 80 MHz or 160 MHz as known in the art.

To meet the ever-increasing demand for faster wireless networks to support bandwidth-intensive applications, 802.11ac is targeting larger bandwidth transmission through multi-channel operations. FIG. 4 illustrates 802.11ac channel allocation that support composite channel bandwidth of 20 MHz, 40 MHz, 80 MHz or 160 MHz.

IEEE 802.11ac introduces support of a restricted number of predefined subsets of 20 MHz channels to form the sole predefined composite channel configurations that are available for reservation by any 802.11ac node on the wireless network to transmit data.

The predefined subsets are shown in FIG. 4 and correspond to 20 MHz, 40 MHz, 80 MHz, and 160 MHz channel bandwidths, compared to only 20 MHz and 40 MHz supported by 802.11n. Indeed, the 20 MHz component channels 400-1 to 400-8 are concatenated to form wider communication composite channels.

In the 802.11ac standard, the channels of each predefined 40 MHz, 80 MHz or 160 MHz subset are contiguous within the operating frequency band, i.e. no hole (missing channel) in the composite channel as ordered in the operating frequency band is allowed.

The 160 MHz channel bandwidth is composed of two 80 MHz channels that may or may not be frequency contiguous. The 80 MHz and 40 MHz channels are respectively composed of two frequency-adjacent or contiguous 40 MHz and 20 MHz channels, respectively. However the present invention may have embodiments with either composition of the channel bandwidth, i.e. including only contiguous channels or formed of non-contiguous channels within the operating band.

A node is granted a TXOP through the enhanced distributed channel access (EDCA) mechanism on the "primary channel" (400-3). Indeed, for each composite channel having a bandwidth, 802.11ac designates one channel as "primary" meaning that it is used for contending for access to the composite channel. The primary 20 MHz channel is common to all nodes (STAs) belonging to the same basic set, i.e. managed by or registered with the same local Access Point (AP).

However, to make sure that no other legacy node (i.e. not belonging to the same set) uses the secondary channels, it is provided that the control frames (e.g. RTS frame/CTS frame) reserving the composite channel are duplicated over each 20 MHz channel of such composite channel.

As addressed earlier, the IEEE 802.11ac standard enables up to four, or even eight, 20 MHz channels to be bound. Because of the limited number of channels (19 in the 5 GHz band in Europe), channel saturation becomes problematic. Indeed, in densely populated areas, the 5 GHz band will surely tend to saturate even with a 20 or 40 MHz bandwidth usage per Wireless-LAN cell.

Developments in the 802.11ax standard seek to enhance efficiency and usage of the wireless channel for dense environments.

In this perspective, one may consider multi-user (MU) transmission features, allowing multiple simultaneous transmissions to/from different users in both downlink (DL) and uplink (UL) directions with a main node, usually an AP. In the uplink, multi-user transmissions can be used to mitigate the collision probability by allowing multiple nodes to simultaneously transmit to the AP.

To actually perform such multi-user transmission, it has been proposed to split a granted 20 MHz channel into sub-channels (elementary sub-channels), also referred to as sub-carriers or resource units (RUs), that are shared in the frequency domain by multiple users, based for instance on Orthogonal Frequency Division Multiple Access (OFDMA) technique.

This is illustrated with reference to FIG. 5. The illustrated 20 MHz channels 500-1 to 500-4 may correspond for example, respectively, to channels 400-1 to 400-4 of FIG. 4.

The multi-user feature of OFDMA allows, a node, usually an access point, AP, to assign different RUs to different nodes in order to increase competition. This may help to reduce contention and collisions inside 802.11 networks.

Contrary to MU downlink OFDMA wherein the AP can directly send multiple data to multiple nodes, a trigger mechanism has been adopted for the AP to trigger MU uplink communications from various nodes.

To support a MU uplink transmission (during a TxOP pre-empted by the AP), the 802.11ax AP has to provide signalling information for both legacy nodes (non-802.11ax nodes) to set their NAV and for 802.11ax nodes to determine the Resource Units allocation.

In the following description, the term legacy refers to non-802.11ax nodes, meaning 802.11 nodes of previous technologies that do not support OFDMA communications.

Figure 5:
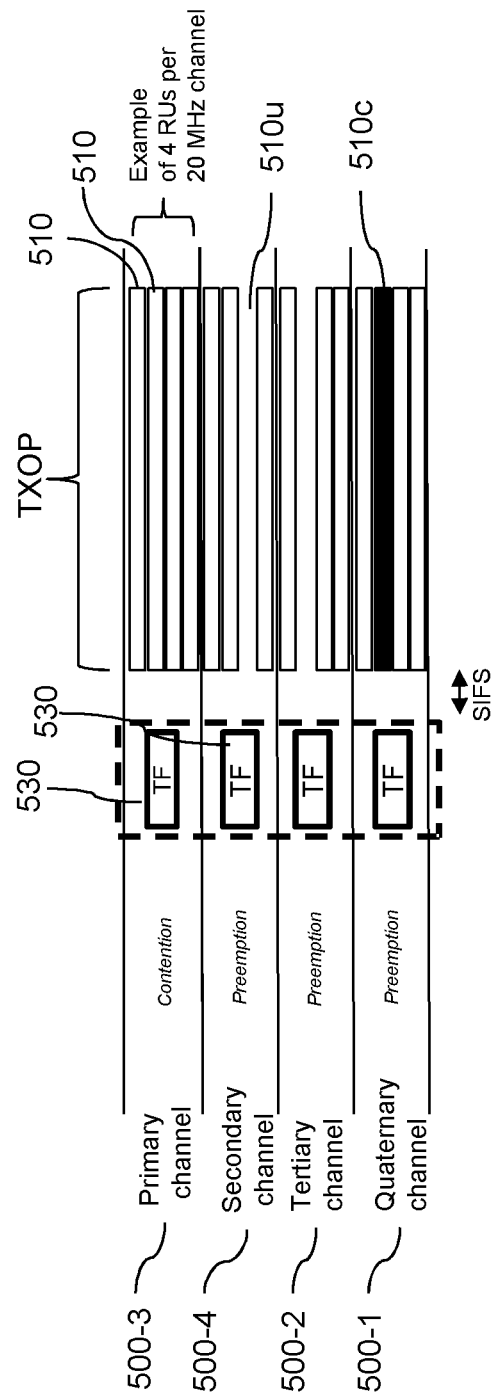
FIG. 5 illustrates an example of 802.11ax uplink OFDMA transmission scheme, wherein the AP issues a Trigger Frame for reserving a transmission opportunity of OFDMA sub-channels (resource units) on an 80 MHz channel as known in the art.

As shown in the example of FIG. 5, the AP sends a trigger frame (TF) 530 to the targeted 802.11ax nodes. The bandwidth or width of the targeted composite channel is signalled in the TF frame, meaning that the 20, 40, 80 or 160 MHz value is signalled. The TF frame is sent over the primary 20 MHz channel 500-3 and duplicated (replicated) on each other 20 MHz channel forming the targeted composite channel, e.g. channels 500-1, 500-2 and 500-4. As described above for the duplication of control frames, it is expected that every nearby legacy node (non-HT or 802.11ac nodes) receiving the TF frame (or a duplicate thereof) on its primary channel, then sets its NAV to the value specified in the TF frame. This prevents these legacy nodes from accessing the channels of the targeted composite channel during the TXOP.

Based on an AP's decision, the trigger frame TF may define a plurality of resource units (RUs) 510 which can be randomly accessed by the nodes of the network (referred to as "Random RUs"). In other words, Random RUs designated or allocated by the AP in the TF may serve as basis for contention between nodes willing to access the communication medium for sending data. A collision occurs when two or more nodes attempt to transmit at the same time over the same RU.

In that case, the trigger frame is referred to as a trigger frame for random access (TF-R). A TF-R may be emitted by the AP to allow multiple nodes to perform MU UL (Multi-User UpLink) random access to obtain an RU for their UL transmissions.

The trigger frame TF may also designate scheduled resource units, in addition to or in replacement of the Random RUs. Scheduled RUs may be reserved by the AP for certain nodes in which case no contention for accessing such RUs is needed for these nodes. Such RUs and their corresponding scheduled nodes are indicated in the trigger frame. For instance, a node identifier, such as the Association ID (AID) assigned to each node upon registration, is added, in the TF frame, in association with each Scheduled RU in order to explicitly indicate the node that is allowed to use each Scheduled RU.

An AID equal to 0 may be used to identify random RUs.

The multi-user feature of OFDMA allows the AP to assign different RUs to different nodes in order to increase competition. This may help to reduce contention and collisions inside 802.11 networks.

In the example of FIG. 5, each 20 MHz channel (500-1, 500-2, 500-3 and 500-4) is sub-divided in the frequency domain into four sub-channels or RUs 510, typically of size 5 Mhz.

Of course the number of RUs splitting a 20 MHz channel may be different from four. For instance, between two to nine RUs may be provided (thus each having a size between 10 MHz and about 2 MHz).

Once the nodes have used the RUs to transmit data to the AP, the AP responds with an acknowledgment ACK (not show in the Figure) to acknowledge the data on each RU, making it possible for each node to know when its data transmission is successful (reception of the ACK) or not (no ACK after expiry of a time-out).

As shown in FIG. 5, some Resource Units may not be used (e.g. 510*u*) because no node has randomly selected one of these random RUs, whereas some others have collided (e.g. 510*c*) because two of these nodes have randomly selected the same RU.

The MU Uplink (UL) medium access scheme, including both scheduled RUs and random RUs, proves to be very efficient compared to conventional EDCA access scheme. This is because the number of collisions generated by simultaneous medium access attempts and the overhead due to the medium access are both reduced.

However, the EDCA access scheme and MU UL OFDMA/RU access scheme have to coexist, in particular to allow legacy 802.11 nodes to access the medium and to allow even the 802.11ax nodes to initiate communication with nodes other than the AP.

Although the EDCA access scheme taken alone provides a fair access to the medium throughout all the nodes, its association with the MU UL OFDMA/RU access scheme introduces a drift in fairness. This is because, compared to the legacy nodes, the 802.11ax nodes have additional opportunities to send data through the resource units offered in the transmission opportunities granted to another node, in particular to the AP.

To restore some fairness between the nodes, a mechanism is proposed to reduce the node's probability of EDCA-based transmission (i.e. using the EDCA medium access scheme) as soon as the node successfully uses the MU UL mechanism to transmit its data. This reduction is made by modifying the well-known EDCA parameters.

Two sets of EDCA parameters values are thus defined. A first set, referred to as Single User (SU) EDCA, includes the parameters values used by a 802.11ax node when in legacy (or conventional) EDCA mode. The SU EDCA parameters values are the same as those used by a legacy node. These parameters usually include $CW_{min}$, $CW_{max}$ and AIFSN for each traffic queue and are illustrated in FIG. 2*b*. A second set, referred to as MU EDCA, includes parameters values used by a 802.11ax node when in a MU EDCA mode. These parameters usually include (MU) $CW_{min}$, (MU) $CW_{max}$ and (MU) AIFSN for each traffic queue and are illustrated in FIG. 2*c* (the "(MU)" term is included for reference only to indicate that the parameters relate to the MU EDCA mode). In the table of FIG. 2*c*, typical respective values for aCWmin and aCWmax are defined in the above-mentioned standard as being respectively 15 and 1023. Other values may be set by a node in the network (typically an Access Point) and shared between the nodes. The values of the MU and SU EDCA parameters may be transmitted by the AP in a Dedicated Information Element, typically sent within a beacon frame broadcasting network information to the nodes. The two MU and SU sets of EDCA parameters may include the same parameters but with different values for at least some of the parameters. The two sets may includes parameters in common and/or different parameters.

For example, after successfully transmitting data in an accessed MU UL OFDMA resource unit, the corresponding transmitting traffic queue AC is set in a MU EDCA mode for a predetermined duration, known as HEMUEDCATimer [AC]. This means that if the 802.11ax node attempts to access the medium using EDCA mechanism within that duration to send data from that queue, the node has to use the MU EDCA parameters values as current EDCA parameters values, instead of the SU EDCA parameters values.

The AIFSN value in MU EDCA mode may be very restrictive, i.e. high value leading to a long waiting time. For example, in high density environment where the medium is busy most of the time (and thus remain free for very short time), the node in MU EDCA mode must wait for a long AIFS period to expire, and thus does not decrement the backoff value of the AC queue in MU EDCA mode very often. The result is that the node cannot EDCA-contend for access to the medium very often. The node may even be prevented from EDCA-accessing the medium while in the MU EDCA mode. For example, the AP may indicate a specific value of the AIFSN parameter (typically 0) in the set of MU EDCA parameters. Such specific value means that the node shall use a very high value for its AIFSN, which value is equal to the HEMUEDCATimer[AC] as transmitted by the AP; e.g. about hundreds of milliseconds, to be compared to less than 0.1 millisecond for the worst AIFS[i] in the legacy SU EDCA mode.

Still, modifying the EDCA parameters values, and especially the AIFSN values, may compromise the QoS that needs to be provided to the upper layer application. The different access schemes need thus to be managed based on the QoS requirements.

Figure 6:
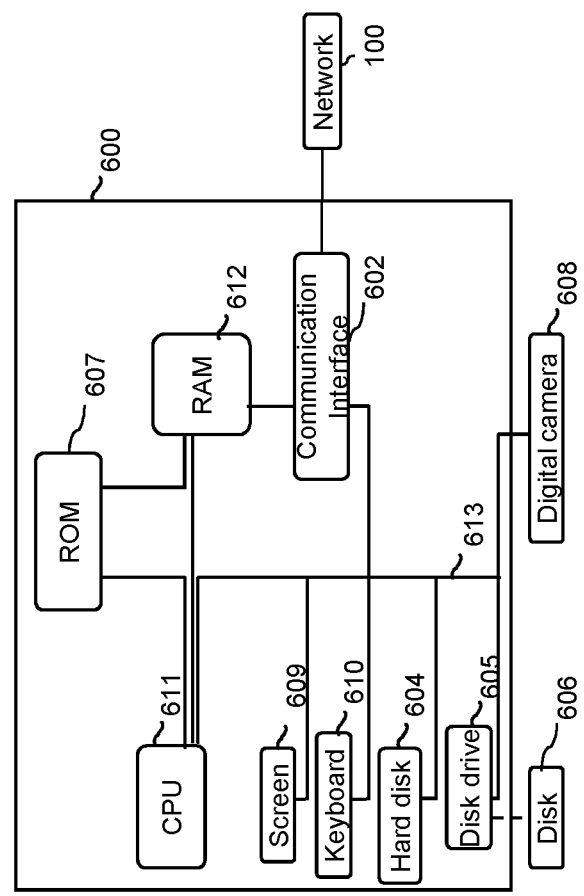
FIG. 6 shows a schematic representation a communication device or station in accordance with embodiments of the present invention.

FIG. 6 schematically illustrates a communication device 600 of the radio network 100, configured to implement at least one embodiment of the present invention. The communication device 600 may preferably be a device such as a micro-computer, a workstation or a light portable device. The communication device 600 comprises a communication bus 613 to which there are preferably connected:

- a central processing unit 611, such as a microprocessor, denoted CPU;
- a read only memory 607, denoted ROM, for storing computer programs for implementing the invention;
- a random access memory 612, denoted RAM, for storing the executable code of methods according to embodiments of the invention as well as the registers adapted to record variables and parameters necessary for implementing methods according to embodiments of the invention; and
- at least one communication interface 602 connected to the radio communication network 100 over which digital data packets or frames or control frames are transmitted, for example a wireless communication network according to the 802.11ax protocol. The frames are written from a FIFO sending memory in RAM 612 to the network interface for transmission or are read from the network interface for reception and writing into a FIFO receiving memory in RAM 612 under the control of a software application running in the CPU 611.

Optionally, the communication device 600 may also include the following components:

- a data storage means 604 such as a hard disk, for storing computer programs for implementing methods according to one or more embodiments of the invention;
- a disk drive 605 for a disk 606, the disk drive being adapted to read data from the disk 606 or to write data onto said disk;
- a screen 609 for displaying decoded data and/or serving as a graphical interface with the user, by means of a keyboard 610 or any other pointing means.

The communication device 600 may be optionally connected to various peripherals, such as for example a digital camera 608, each being connected to an input/output card (not shown) so as to supply data to the communication device 600.

Preferably the communication bus provides communication and interoperability between the various elements included in the communication device 600 or connected to it. The representation of the bus is not limiting and in particular the central processing unit is operable to communicate instructions to any element of the communication device 600 directly or by means of another element of the communication device 600.

The disk 606 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may optionally be stored either in read only memory 607, on the hard disk 604 or on a removable digital medium such as for example a disk 606 as described previously. According to an optional variant, the executable code of the programs can be received by means of the communication network 603, via the interface 602, in order to be stored in one of the storage means of the communication device 600, such as the hard disk 604, before being executed.

The central processing unit 611 is preferably adapted to control and direct the execution of the instructions or portions of software code of the program or programs according to embodiments of the invention, which instructions are stored in one of the aforementioned storage means. On powering up, the program or programs that are stored in a non-volatile memory, for example on the hard disk 604 or in the read only memory 607, are transferred into the random access memory 612, which then contains the executable code of the program or programs, as well as registers for storing the variables and parameters necessary for implementing the invention.

In a preferred embodiment, the apparatus is a programmable apparatus which uses software to implement the invention. However, alternatively, the present invention may be implemented in hardware (for example, in the form of an Application Specific Integrated Circuit or ASIC).

Figure 7:
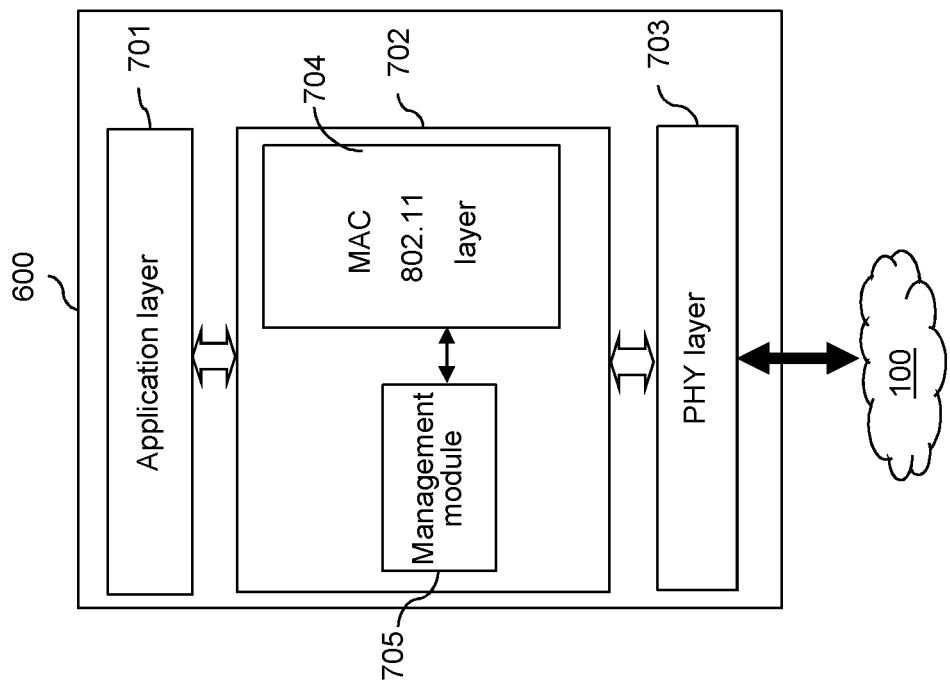
FIG. 7 shows a schematic representation of a wireless communication device in accordance with embodiments of the present invention.

FIG. 7 is a block diagram schematically illustrating the architecture of a communication device or node 600, in particular one of nodes 100-107, adapted to carry out, at least partially, the invention. As illustrated, node 600 comprises a physical (PHY) layer block 703, a MAC layer block 702, and an application layer block 701.

The PHY layer block 703 (here an 802.11 standardized PHY layer) has the task of formatting frames, modulating frames on or demodulating frames from any 20 MHz channel or the composite channel, and thus sending or receiving frames over the radio medium used 100. The frames may be 802.11 frames, for instance medium access trigger frames TF 530 to define resource units in a granted transmission opportunity, MAC data and management frames based on a 20 MHz width to interact with legacy 802.11 stations, as well as of MAC data frames of OFDMA type having smaller width than 20 MHz legacy (typically 2 or 5 MHz) to/from that radio medium.

The MAC layer block or controller 702 preferably comprises a MAC 802.11 layer 704 implementing conventional 802.11ax MAC operations, and a management module 705 for carrying out, at least partially, embodiments of the invention. The MAC layer block 702 may optionally be implemented in software, which software is loaded into RAM 612 and executed by CPU 611.

MAC 802.11 layer 704 and management module 705 interact one with the other in order to provide management of the channel access module handling the queue backoff engines and a RU access module handling the RU backoff engine as described below.

On top of the Figure, application layer block 701 runs an application that generates and receives data packets, for example data packets of a video stream. Application layer block 701 represents all the stack layers above MAC layer according to ISO standardization.

Embodiments of the present invention are now illustrated using various exemplary embodiments. Although the proposed examples use a centralized environment (i.e. with an AP), equivalent mechanisms can be used in an ad-hoc environment (i.e. without an AP). It means that the operations described below with reference to the AP may be performed by any node in an ad-hoc environment.

These embodiments are mainly described in the context of IEEE 802.11ax by considering OFDMA resource units. Application of the invention is however not limited to the IEEE 802.11ax context.

Also the present invention does not necessarily rely on the usage of a MU access scheme as described in 802.11ax. Any other RU access scheme defining alternate medium access schemes allowing simultaneous access by the nodes to the same medium can also be used.

The set of MU EDCA parameters values may be more restrictive than the set of SU EDCA parameters values, resulting for a traffic queue being in the MU EDCA mode to access less often the medium using SU EDCA mode.

However, the set of MU EDCA parameters values may be more permissive in some embodiments.

For the sake of clarity, the explanations below focus on a set of MU EDCA parameters values that is more restrictive. In this context, the MU EDCA mode is referred to as the "degraded" mode, while the SU EDCA mode is referred to as "non-degraded" mode.

Figure 8B:
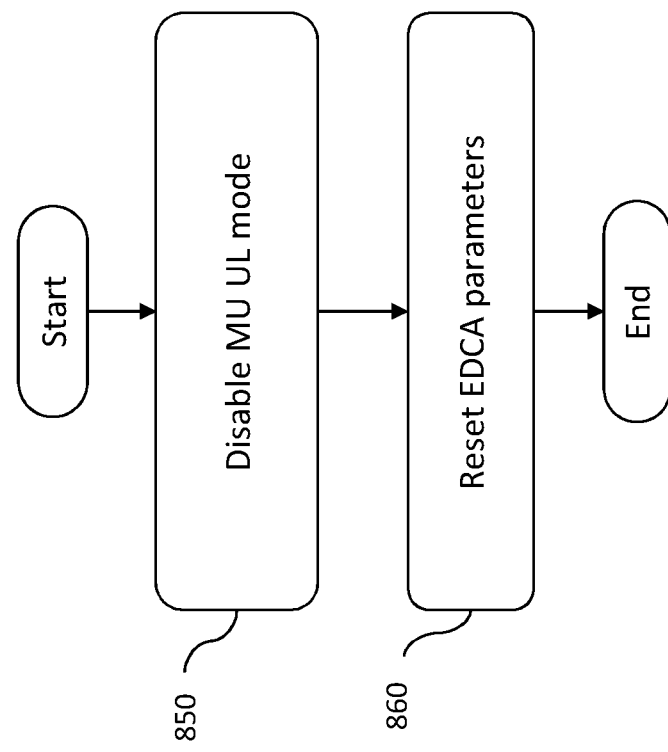
FIG. 8b illustrates, using a flowchart, the node management of quality of service according to a second embodiment of the invention.
Figure 8A:
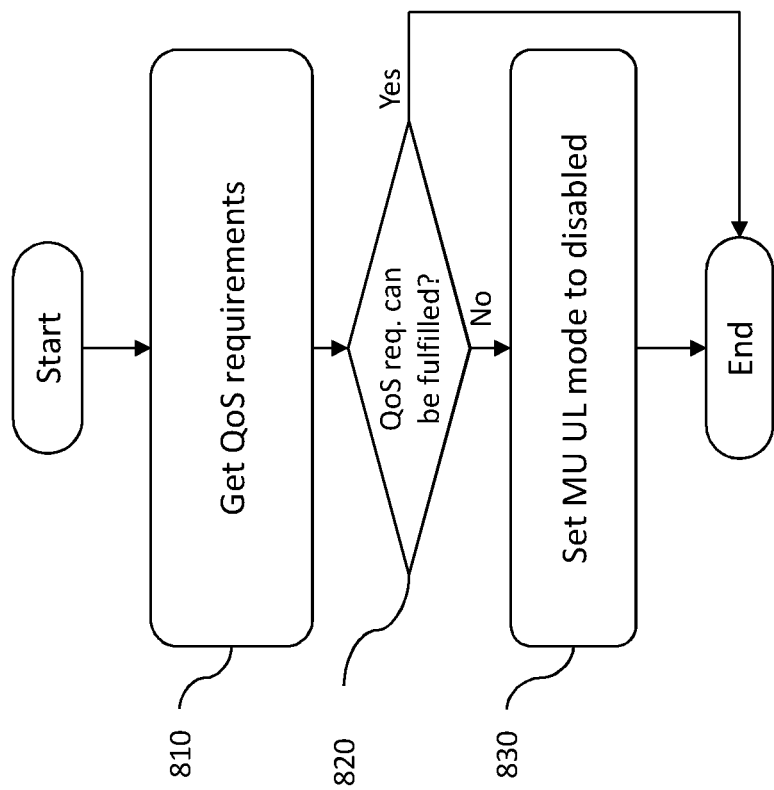
FIG. 8a illustrates, using a flowchart, the node management of quality of service according to first embodiment of the invention.

FIG. 8a illustrates, using a flowchart, the node management of quality of service according to first embodiment of the invention. In this first embodiment, conditions under which the MU UL mode needs to be disabled are determined to fulfil QoS requirements of the data provided by the upper application layer.

At step 810, QoS requirements are obtained. These requirements may include, among others:
  data rate,
  transmission latency, and/or
  need for peer-to-peer communication (direct link).

At step 820, the management module checks whether the QoS requirements can be fulfilled. For example, the QoS requirements are not fulfilled in each of the following:
  the RUs scheduled by the AP in the MU UL mode and the MU EDCA parameters values for the MU EDCA mode cannot sustain the QoS requirements;
  Need to transmit data in direct link mode (e.g. to ensure low latency) and the MU EDCA parameters for the MU EDCA mode cannot sustain the QoS requirements.

If it is checked that the QoS requirements cannot be fulfilled, the management module sets at step 830 the MU UL mode to disabled. For example, the node informs the AP of the temporary non support of MU UL capability. According to one implementation, the station prepares an OMI A-Control field with the MU UL disable bit set to 1. This control filed being included in the next frame to be sent to the AP (note that if there is no such a frame already ready in the emitting queues of the station, the station can create a dedicated frame and send it to the AP). Optionally, an internal flag TEMP_SU_UL_ON may also be set to true to keep track of the temporary modification of the capability of the station.

It is assumed in the first embodiment that a 802.11ax node has its MU UL capability enabled by default at start-up. In an alternate embodiment, it may be assumed that, at start-up, the 802.11ax node executes the steps 810 and 820 and then decides to set the MU UL mode to enabled (step not illustrated) if the QoS requirements can be fulfilled and to disabled (i.e. step 830) if the QoS requirements cannot be fulfilled.

This embodiment advantageously takes the best benefit of the two medium access schemes with regard to its needs in terms of QoS. The station can then decide to use both mechanisms at the same time (case Yes of the step 820), or use only the EDCA medium access scheme (case No of the test 820). This allows the station to switch off the support of the MU UL OFDMA only if needed, e.g. if the QoS constraints evolve over time (evolution of the needs of the upper layer application, or evolution of the effective performance of the network).

FIG. 8b illustrates, using a flowchart, the node management of quality of service according to a second embodiment of the invention. This second embodiment specifies the behavior of a node after a MU UL mode has been disabled, for whatever reason. It is to be noted that the second embodiment may be implemented following the disabling of the MU UL mode according to the first embodiment, but may also be implemented independently from the first embodiment.

At step 850, the management module sets the MU UL mode to disabled. For example, the node informs the AP of the temporary non support of MU UL capability. According to one implementation, the station prepares an OMI A-Control field with the MU UL disable bit set to 1. This control filed being included in the next frame to be sent to the AP (note that if there is no such a frame already ready in the emitting queues of the station, the station can create a dedicated frame and send it to the AP). Optionally, an internal flag TEMP_SU_UL_ON may also be set to true to keep track of the temporary modification of the capability of the station.

Figure 14A:
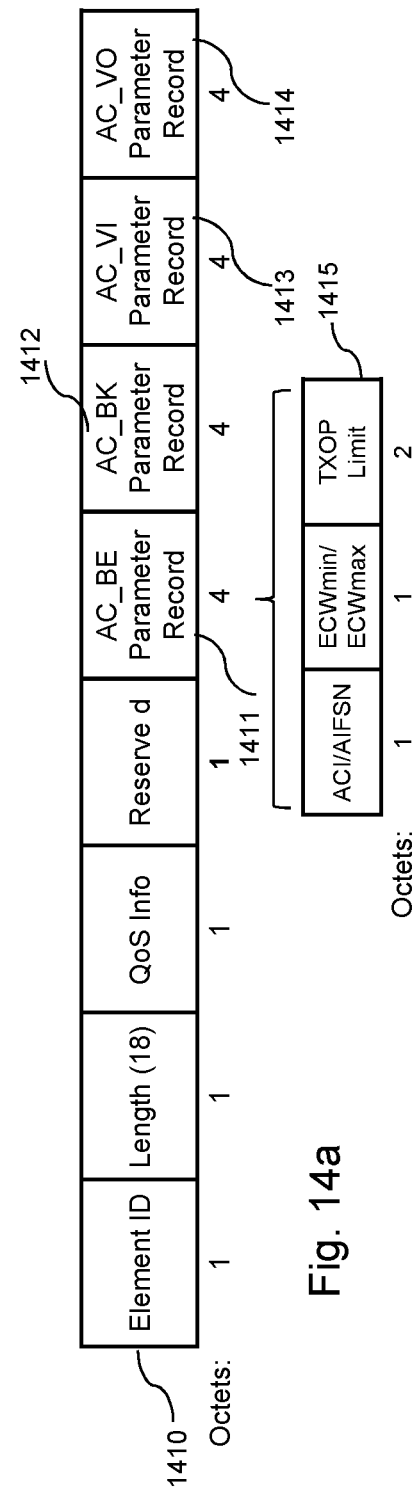
FIG. 14a illustrates the structure of a standardized information element used to describe the parameters of the SU EDCA in a beacon frame.

At step 860, current values of EDCA parameters of the AC in MU EDCA mode are reset with the latest SU EDCA values received from the AP. These values can be retrieved from the corresponding fields 1411 to 1414 of the frame 1410 as illustrated in FIG. 14a. In addition, this step may optionally set the values of the HEMUEDCATimer for each ACs to 0.

In this embodiment, the station can advantageously speed-up the process of sending data using the EDCA medium access since the station doesn't have to wait for the potential expiration of the HEMUEDCATimers. Those timers' values being potentially different, the AC queues will then be usable at different times. This could generate an ordering issue of the different traffic the station wants to send.

Figure 9:
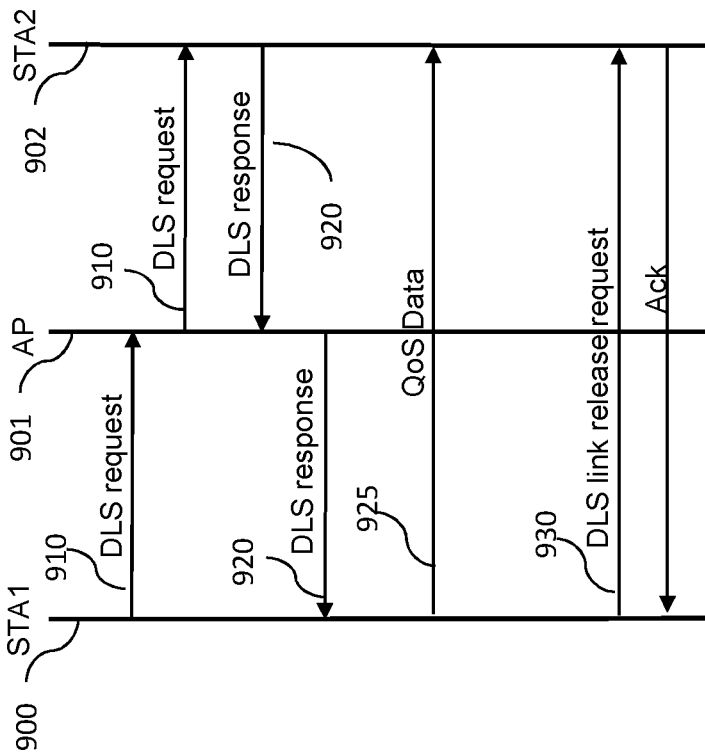
FIG. 9 illustrates, using a sequence diagram, main frame exchanges performed by two nodes and the AP, during a Direct Link Setup.

FIG. 9 illustrates, using a sequence diagram, the frame exchange procedure used during the setup of the Direct Link between two stations as described in the IEEE 802.11e amendment of the 802.11 standard.

The direct link setup has been introduced to allow stations that belong to a same BSS, to directly exchange data frames without being relayed by the AP. The established direct link avoids emitting the same frame twice on the medium, and enhances the latency of communications between stations of a same BSS. This Direct link establishment mechanism is supported by the access point since all the establishment frames are relayed by the AP.

To initiate a direct link, the station 900 willing to initiate a direct link (STA1 in the following) with another station 902 of the BSS (STA2 in the following), sends a DLS request 910 to STA2. In infrastructure mode, this frame is firstly received by the AP 901, then forwarded by the AP 901 to the final destination 902 (STA2). Upon reception of the DLS Request 910, if STA2 agrees, STA2 sends a DLS response 920 to STA1 via the AP.

Then, STA1 and STA2 can exchange frames (for instance QoS Data frame 925) directly without being forwarded by the AP.

Embodiments of the invention provide a solution to ensure the coexistence between the direct link and the Multi user uplink mechanisms. The stations involved in a direct link setup procedure thus ensures that the current values of the MU EDCA parameters (latest values received from the AP) will allow a correct establishment of the direct link (or tunneled direct link), and that the established direct link will be compatible with the performances required by the upper layer application requesting this direct link establishment. Especially, the latency requirement can be problematic with regards of the degraded MU EDCA parameters values.

Figure 11:
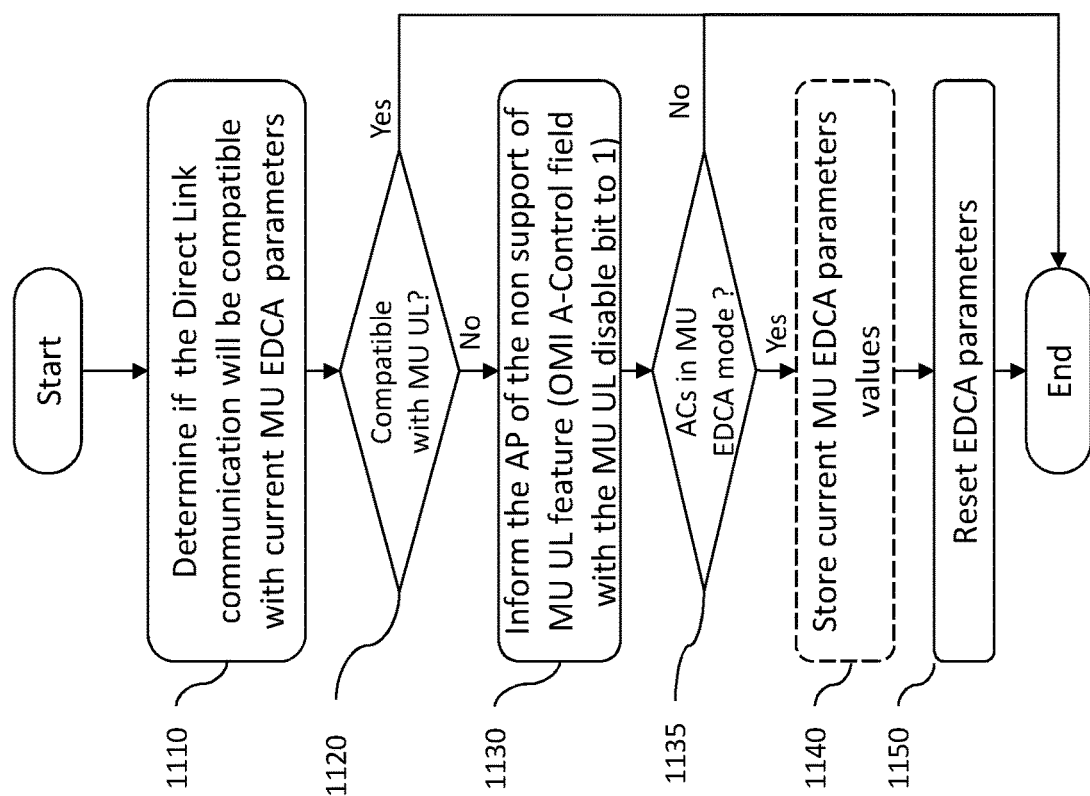
FIG. 11 illustrates, using a flowchart, steps of temporary deny the support of the MU UL feature by a node upon DLS or TDLS activation, according to embodiments of the invention.

In a third embodiment of the invention, upon reception of the DLS Response 920 by STA1, STA1 will execute additional steps 1110 to 1150 described in the FIG. 11 to ensure that the direct sending of frames to STA2 will be possible in good conditions (conditions compatible with the MU EDCA parameter set as described in step 1110). STA2 executes the additional steps 1110 to 1150 upon reception of the DLS request 910. In this third embodiment, STA1 can potentially send its frame MU UL mode until the end of the direct link setup procedure. The advantage of such an embodiment is that the STA1 can take benefit of the MU UL mechanism to transmit it direct link request frame, and doesn't have to change its EDCA parameters in case of failure of the setup procedure.

In a fourth embodiment of the invention, the additional steps 1110 to 1150 are executed before the emission of the DLS request 910 by STA1, while STA2 execute the additional step 1110 to 1150 upon reception of the DLS request frame 910 as in the third embodiment. The advantage of this fourth embodiment is that STA1 can be ready to transmit a direct frame to STA2 as soon as the DLS response 920 is received, while previous third embodiment has to wait the end of the additional steps 1110 to 1150 execution (especially the transmission of the OMI A-Control field in step 1130) before being able to use the SU EDCA parameters values to access the medium.

Figure 12:
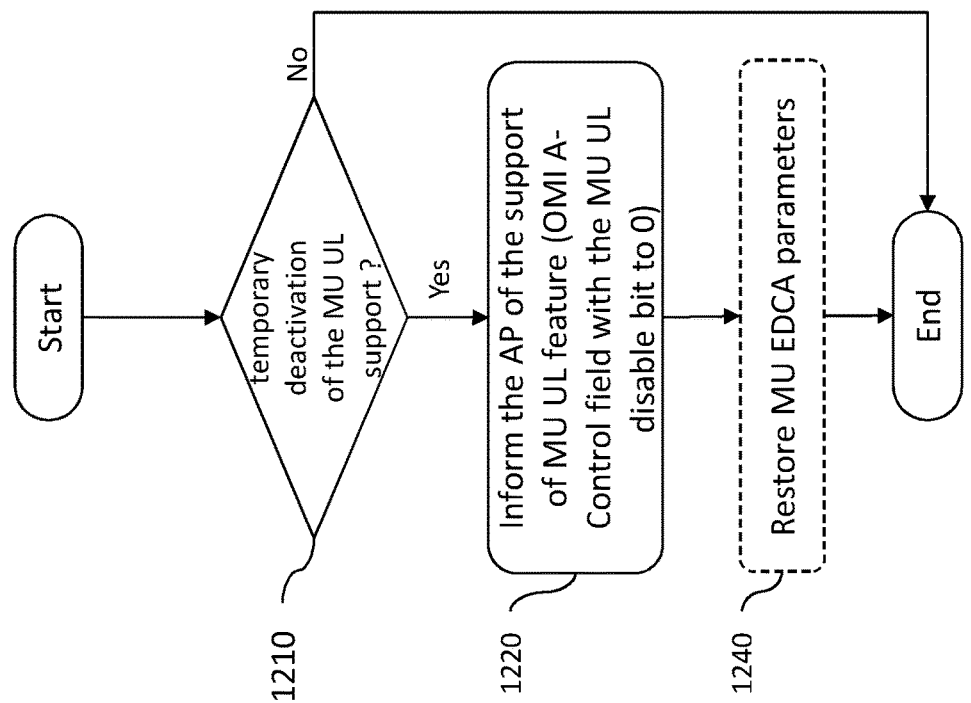
FIG. 12 illustrates, using a flowchart, steps of restoring the support of the MU UL feature, temporary denied, upon DLS or TDLS deactivation, according to embodiments of the invention.

At the end of the communication, a DLS link release request frame 930 is send by the station willing to finish the communication, and this station executes the additional steps 1210 to 1240 of FIG. 12 to potentially restore the support of the MU UL capability. The station receiving the DLS link release request 930 will acknowledge this frame, and execute the additional steps 1210 to 1240 according to embodiments of the invention.

Figure 10:
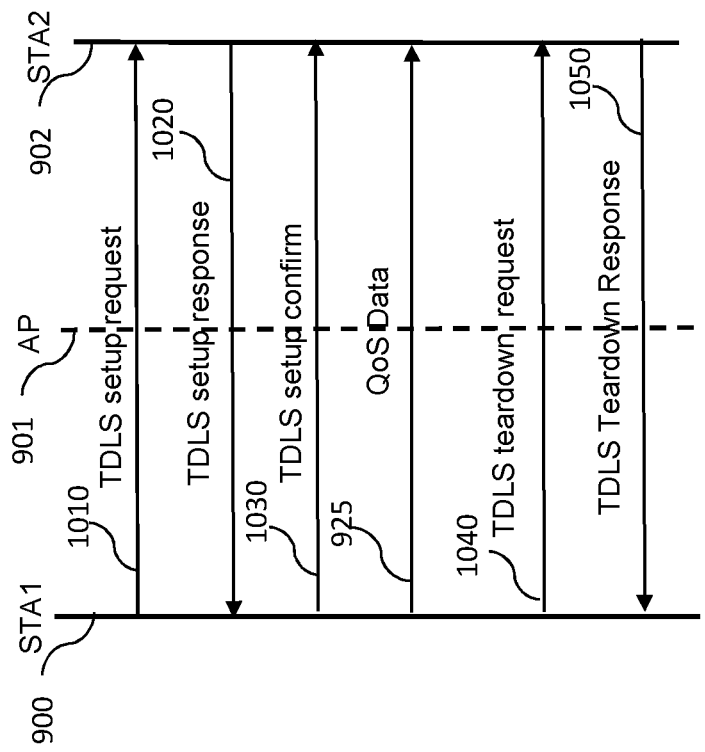
FIG. 10 illustrates, using a sequence diagram, main frame exchanges performed by two nodes and the AP, during a Tunneled Direct Link Setup.

FIG. 10 illustrates using a sequence diagram, the tunneled direct link setup procedure as described in the 802.11z amendment of the 802.11 standard, and the associated teardown procedure. The tunneled direct link is a modification of the direct link setup procedure, during which the AP has no role, and is not informed of the established direct link.

Due to the fact that each and every frame of the TDLS setup is sent directly between the peer stations, the additional steps 1110 to 1150 of FIG. 11 are executed prior the sending of the TDLS setup request 1010 by STA1 and upon reception of this frame on STA2.

Then, classical TDLS setup procedure occurs. STA1 sends a TDLS setup request frame 1010 to STA2. If STA2 agree, STA2 send a TDLS setup response 1020 indicating an acceptance of the TDLS procedure. Upon reception of a positive TDLS setup response (response containing an acceptance by the STA2), STA1 sends back a TDLS confirm frame 1030 to STA2. Then the Tunneled direct link is established, and the stations can exchange direct frames like for instance the QoS Data frame 925.

At the end of the Tunneled direct link session, the station willing to close the session, sends a TDLS Teardown request 1040 and execute the additional step 1210 to 1240 of FIG. 12 according to embodiments of the invention. The station receiving this TDLS teardown request 1040, responses with a TDLS Teardown Response 1050, and execute the additional step 1210 to 1240 of FIG. 12 according to embodiments of the invention.

FIG. 11 illustrates using a flow chart the additional steps, according to one implementation variant of the invention, to be performed by the station during the direct link or tunneled direct link setup procedure in order to ensure the compatibility of the direct link session and the potential usage of the multi user uplink medium access scheme. The determination of the compatibility of the direct link with the MU EDCA parameters according to the present implementation variant may also be used as an alternative criteria for checking that the QoS requirements can be fulfilled in the test 820 of the first embodiment.

At step 1110, it is first determined if the Direct Link communication will be compatible with current MU EDCA parameters. At this step, the station first checks if the MU EDCA parameters allow a direct link establishment (i.e. checks the MU AIFSN values of the latest MU AC parameter records 1421 to 1423 received in the beacon frame). If at least one AC has a MU AIFSN value equal to zero, this AC will not be able to send data directly to the peer station, as soon as the MU UL transmission scheme is used by the station. In this condition, the station have to temporary disable its MU UL capability support. Especially, the direct link and tunneled direct link setup frames being sent in the lowest priority AC (AC_BG), if the AIFSN value for this AC is equal to zero, then the station will not be able to establish a direct link session.

In a variant, additional verifications can be applied by the STA to determine if the direct link communication is compatible with the usage of the MU UL transmission scheme. Even if the first verification determines that there is no incompatibility between the MU UL usage and the establishment of a direct link session, it can be useful to verify that the established direct link session will allow the transmission of the direct frames in compliance with the performances required by the upper layer application (for instance video streaming). In the case of the video streaming for instance, the station cannot afford to penalize the AC_VI corresponding to the sending of video. The same kind of test can be performed by the station of other kind of application and corresponding AC (audio conferences and AC_VO, visio-conferences and AC_VO and AC_VI etc.).

After performing the different verifications described in the different embodiments, the station can determine if the Direct Link communication will be compatible with current MU EDCA parameters values.

Then step 1120 is executed. If step 1110 determined that the Direct Link communication will not be compatible with current MU EDCA parameters values, step 1130 is executed otherwise, the algorithm finished.

At step 1130, the node informs the AP of the temporary non support of MU UL capability. According to one implementation, the station prepares an OMI A-Control field with the MU UL disable bit set to 1. This control filed being included in the next frame to be sent to the AP (note that if there is no such a frame already ready in the emitting queues of the station, the station can create a dedicated frame and send it to the AP). Optionally, an internal flag TEMP_SU_UL_ON may also be set at step 1130 to true to keep track of the temporary modification of the capability of the station.

At step 1135, the management module determines if one or more AC of the stations are already in MU EDCA mode. According to one implementation, the station checks if one of the HEMUEDCATimer[AC] timers is not set to null. If it is determined that no AC is already in MU EDCA mode, then the algorithm stops, else, step 1140 is executed.

The optional step 1140 stores, in a local memory, for each AC in MU EDCA mode, the current values of the EDCA parameters, and the corresponding values of the active HEMUEDCA Timer. Storing the parameters values makes it possible for the station to restore those parameters values after the direct link teardown in step 1240 of the FIG. 12. This step is optional since in another variant of step 1240, the AC mode is not modified when the station reactivate the support of the MU UL, but only upon successful transmission in MU UL mode (as described in the standard).

At step 1150 the values of EDCA parameters of the AC in MU EDCA mode are changed. During this step, the EDCA parameters of those ACs are set with the latest SU EDCA parameters values received from the AP in the corresponding field 1411 to 1414 of the frame 1410. In addition and optionally, the values of the HEMUEDCATimer for each ACs are set to 0 at step 1150.

Steps 1110 and 1120 advantageously allow the station to anticipate the QoS issues that will occur when trying to send data packets of a specific application (for instance Direct link applications). This embodiment doesn't need to wait for the effective occurrence of latency or throughput issues to switch to a more adapted transmission mode (EDCA only transmission, in legacy mode).

The execution of steps 1140 and 1150 allows to quickly switch towards using SU EDCA parameters values (step 1140), while remaining fair by enabling to go back to the penalized state (remembering the previous state) after the end of the conditions requiring the disabling of the MU UL feature support. Especially, by storing the HEMUEDCATimers value, the station can restore those values without having them reinitialized (and thus avoiding to wait for a new HEMUEDCATimer period) and then immediately returns in MU EDCA mode without having to wait for a transmission opportunity provided by a trigger frame.

FIG. 12 illustrates using a flow chart the additional steps, according to one implementation variant of the invention, to be performed by the station after the direct link or tunneled direct link tear down procedure in order to restore the optimal efficiency of the Multi user uplink mechanism thanks to the usage of MU EDCA parameters.

At step 1210, the management module determines if the node has temporarily suspended its MU UL support. For example, the station may check if TEMP_SU_UL_ON is set to true. If step 1210 determine that the station has temporarily suspended its MU UL support, step 1220 is executed, otherwise, the algorithm ends.

At step 1220, the node informs the AP of the support of MU UL capability. According to one implementation, the node prepares an OMI A-Control field with the MU UL disable bit set to 0. This control filed being included in the next frame to be sent to the AP (note that if there is no such a frame already ready in the emitting queues of the station, the station can create a dedicated frame and send it to the AP). Optionally, the flag TEMP_SU_UL_ON may also be set to its default value (false).

Step 1240 is an optional step. At this step, the station restores the EDCA parameters of the ACs in MU EDCA mode at the time of the initiation of a direct link session, and the value of the HEMUEDCATimer for those ACs. Those values are restored thanks to the values stored at step 1140. This optional step allows to be fairer by going back to the original situation (prior direct link session activation).

This embodiment advantageously allows to support back the MU UL OFDMA feature and then to disable this feature only during the required period of time. In addition, the feature of step 1240 leads to a fair behavior that is to go back to the MU EDCA support by immediately applying some penalized values on the EDCA parameters without re-initialization. It is then noted that thanks to the step 1210, the station knows that it was previously in MU EDCA mode. This mechanism avoids some fairness issues that could result from a quick sequence of switching between the support and disabling of the MU UL feature (case of a station rapidly disabling the MU UL support to use the non-penalized EDCA parameters values).

Figure 13:
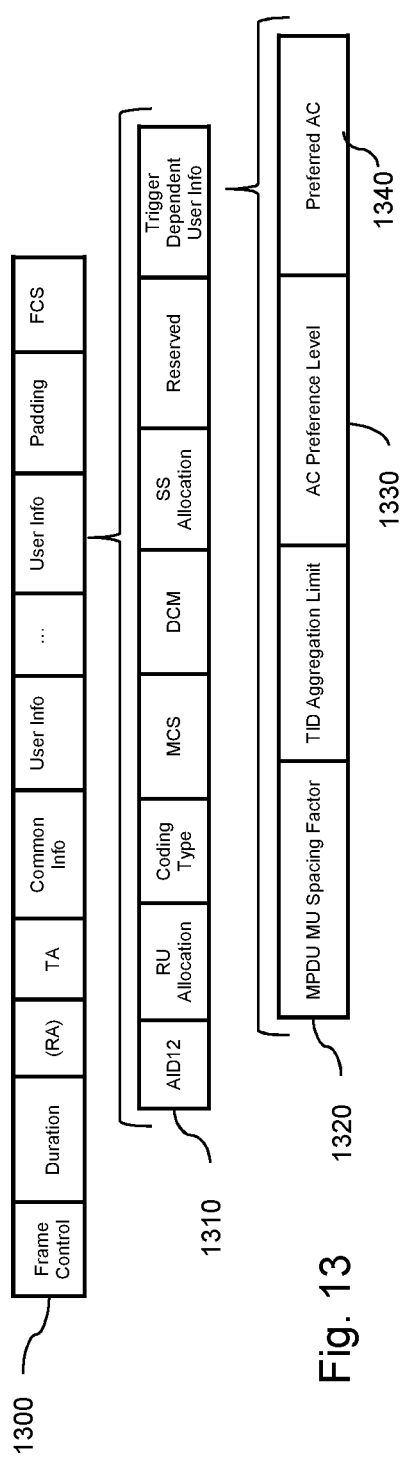
FIG. 13 illustrates the structure of a trigger frame according to an embodiment of the invention.

FIG. 13 illustrates the structure of a trigger frame according to an embodiment of the invention.

The trigger frame 1300 is composed of a dedicated field 1310 called User Info Field. This field contains a "Trigger dependent Common info" field 1320 which contains the "AC Preference Level" field 1330 and "Preferred AC" field 1340.

The Preferred AC field 1340 is a 2-bit field indicating the AC queue (value from 0 to 3) from which data should be sent by the node on the RU allocated to that node in the trigger frame.

The AC preference Level field 1330 is a bit indicating if the value of the Preferred AC field 1340 is meaningful or not. If the field 1340 is set to 1, then the node should take into account the preferred AC field 1340 when selecting data at step 1130. If the field 1330 is set to 0, the node is allowed to send data from any AC queue, regardless of the preferred AC field 1340 value.

The other fields of the trigger frame are similar to what is defined in the 802.11ax standard.

The AP may also be in charge of broadcasting the EDCA parameters for both SU EDCA mode and MU EDCA mode. It preferably performs the broadcasting using a well-known beacon frame, dedicated to configure all the nodes in an 802.11 cell. Note the if the AP fails to broadcast the EDCA parameters, the nodes are configured to fall-back to by-default values as defined in the 802.11ax standard.

FIG. 14a illustrates the structure of a standardized information element 1410 used to describe the SU EDCA parameters of the EDCA in a beacon frame.

Fields 1411, 1412, 1413, 1414 describes the SU EDCA parameters associated with each traffic queue 210. For each traffic queue, a subfield 1415 includes the SU EDCA parameters: AIFSN as a delay before starting to decrease the associated backoff value, the ECWmin and ECWmax as the values of the minimum $CW_{min}$ and maximum $CW_{max}$ contention window and finally the TXOP limit as the maximum transmitting data time for an 802.11 device.

All the others fields of the information element are those described in the 802.11 standard.

Figure 14B:
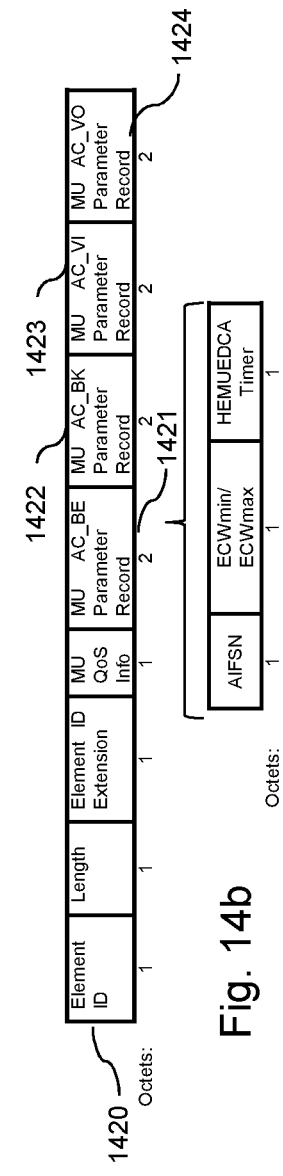
FIG. 14b illustrates an exemplary structure of a dedicated information element to transmit the degraded MU EDCA parameter values, as well as the HEMUEDCATimer values.

FIG. 14b illustrates an exemplary structure of a dedicated information element 1420 to transmit the MU EDCA parameters corresponding to degraded EDCA parameter values, as well as the HEMUEDCATimer values. The dedicated information element 1420 may be included in a beacon frame sent by the AP.

The dedicated information element 1420 includes, for each AC queue, the MU EDCA parameters (1421,1422, 1423,1424) to be used by the nodes in the MU EDCA mode.

Each subfield 1421,1422,1423,1424 includes the degraded AIFSN value for the corresponding traffic queue, the degraded ECWmin value and degraded ECWmax value (they can be the same as the legacy EDCA values), as well as the value of the HEMUEDCATimer.

The degrading duration HEMUEDCATimer drives the nodes entering one of its AC the MU EDCA mode to maintain this AC in such mode at least the degrading duration.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A communication method in a communication network comprising a plurality of nodes, at least one node comprising at least one traffic queue for serving data traffic, the traffic queue being associated with a queue backoff value to contend for access to a communication channel in order to transmit data stored in the traffic queue according to a first access scheme, the queue backoff value being computed from respective queue contention parameters that are set with either first or second values, wherein transmitting data stored in the traffic queue according to a second access scheme causes setting contention parameters of the traffic queue for the first access scheme to the second values for a predetermined duration;

the method comprising, at the node:
disabling the second access scheme;
in response to the disabling of the second access scheme, setting contention parameters of the traffic queue for the first access scheme to the first values, without waiting expiration of the predetermined duration; and
transmitting data stored in the traffic queue according to the first access scheme using the first values.

2. The method of claim 1, wherein the second access scheme provides access to resource units provided by another node within one or more transmission opportunities granted to the another node on the communication channel.

3. The method of claim 1, further comprising, at the node, periodically receiving a beacon frame from an access point, each beacon frame broadcasting network information about the communication network to the plurality of nodes, wherein at least one received beacon frame includes the first values and the second values for the contention parameters of the traffic queue.

4. The method of claim 2, wherein the another node is an access point of the communication network to which nodes register.

5. The method of claim 4, wherein the disabling of the second access scheme comprises sending an information to the access point informing that the node is not supporting access to the resource units.

6. The method of claim 1, wherein the contention parameters include a lower boundary $CW_{min}$ and/or higher boundary $CW_{max}$, both defining a selection range from which a size of the contention window is selected, and an Arbitration Inter-Frame Space Numbers, AIFSN.

7. The method of claim 6, wherein the first values and the second values differ by different Arbitration Inter-Frame Space Numbers, AIFSNs.

8. The method of claim 1, wherein the disabling of the second access scheme is responsive to obtaining a service requirement for sending data in a direct link mode.

9. The method of claim 2, wherein the node implements a timer that measures the predetermined duration by counting down from an initial value to zero.

10. The method of claim 9, wherein the counting down of the timer starts after a successful transmission of data in one or more provided resource units.

11. The method of claim 9, wherein the setting of the contention parameters to the first values comprises forcing the expiration of the predetermined duration by setting the timer to zero, thereby triggering the setting of the contention parameters without waiting expiration of the predetermined duration.

12. The method of claim 9, wherein the node comprises a plurality of traffic queues and implements one timer per traffic queue, thereby a predetermined duration can be separately measured for each traffic queue.

13. The method of claim 12, wherein the setting of the contention parameters to the first values comprises forcing the expiration of the predetermined duration of each traffic queue.

14. The method of claim 1, wherein the second values for the queue contention parameters are only available when the second access scheme is enabled.

15. A non-transitory computer-readable storage medium storing instructions of a computer program for implementing the method according to claim 1.

16. A communication device node in a communication network comprising a plurality of nodes, the communication device node comprising:
at least one traffic queue for serving data traffic, the traffic queue being associated with a queue backoff value to contend for access to a communication channel in order to transmit data stored in the traffic queue according to a first access scheme, the queue backoff value being computed from respective queue contention parameters that are set with either first or second values, wherein transmitting data stored in the traffic queue according to a second access scheme causes setting contention parameters of the traffic queue for the first access scheme to the second values for a predetermined duration; and
at least one microprocessor configured for carrying out the following steps:
disabling the second access scheme;
in response to the disabling of the second access scheme, setting contention parameters of traffic queue for the first access scheme to the first values, without waiting expiration of the predetermined duration; and
transmitting data stored in the traffic queue according to the first access scheme using the first values.

17. The communication device node of claim 16, wherein the at least one microprocessor is further configured for carrying out the step of periodically receiving a beacon frame from an access point, each beacon frame broadcasting network information about the communication network to the plurality of nodes, wherein at least one received beacon frame includes first values and second values for the queue contention parameters of the traffic queue.

18. The communication device node of claim 16, wherein the other node is an access point of the communication network to which nodes register and wherein the at least one microprocessor is further configured so that the disabling of the second access scheme comprises sending an information to the access point informing that the communication device node is not supporting access to the resource units.

19. The communication device node of claim 16, wherein the communication device node implements a timer that is updated after a successful transmission on a resource unit and that counts down to zero, thereby defining a predetermined duration during which access to resource units is enabled.

* * * * *